(No Model.)

F. STILES.
MILK COOLER.

No. 429,972. Patented June 10, 1890.

WITNESSES:
Fred G. Dieterich
P. B. Turpin

INVENTOR:
Frederick Stiles.
BY
ATTORNEYS

UNITED STATES PATENT OFFICE.

FREDERICK STILES, OF BURNET, TEXAS.

MILK-COOLER.

SPECIFICATION forming part of Letters Patent No. 429,972, dated June 10, 1890.

Application filed February 15, 1890. Serial No. 340,646. (No model.)

*To all whom it may concern:*

Be it known that I, FREDERICK STILES, of Burnet, in the county of Burnet and State of Texas, have invented a new and useful Improvement in Milk-Coolers, of which the following is a specification.

My invention is an improved cooling apparatus intended for use as a milk-cooler or for cooling water, vegetables, or other substances, as may be desired.

The invention consists in certain novel constructions and combinations of parts, as will be hereinafter described, and pointed out in the claims.

Figure 1:
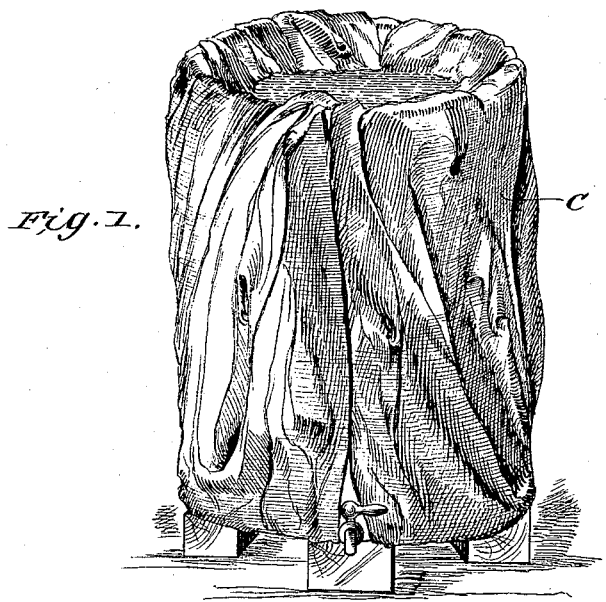
Figure 2:
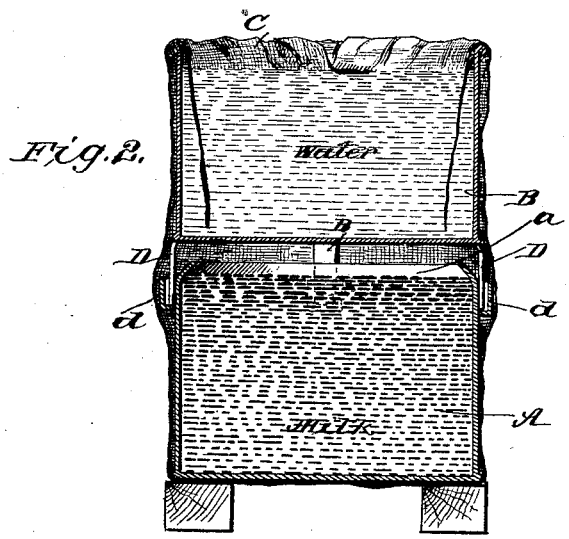

In the drawings, Figure 1 is a perspective view of my improved cooling apparatus, and Fig. 2 is a vertical longitudinal section of the same.

The apparatus consists of the main vessel A, the water-vessel B, and the enveloping-sheet C, such parts being constructed and arranged as shown, and as I will now describe in detail.

The vessel A, termed the "main vessel," is adapted to contain the substance to be cooled, and may be provided near its bottom with a spigot to facilitate the drawing off of its liquid contents. At its upper open end this vessel is drawn inward or inclined inward at $a$, as shown, so that its open end will be in from the outer edge of the bottom of the vessel B, to avoid the passage into the vessel A of water which may drip down the outer side of the vessel B. This inward inclination of the upper end of the vessel A is quite simple, and efficiently serves the purpose in view. Above and on the vessel A, I support the vessel B, preferably by means of legs D, depending from the vessel B and fitting sockets $d$ on the vessel A.

The upper end of vessel B is open, while its sides and bottom are imperforate. It will be seen that I so support the vessel B as to hold its bottom above the upper open end of vessel A, and so provide a space between said vessel and a lateral exit or outlet for the fumes, gases, &c., which may arise from the substance being cooled.

The enveloping-sheet C is placed under the main vessel, which, preferably, is supported on small blocks, as shown. The said sheet is then drawn upward outside of vessels A B and fitted at its free edges in the vessel B, down in which its edges are pressed, so as to be wet by the contents of said vessel.

In operation it will be understood that the sheet C, which may be an ordinary sheet of cotton cloth, is wet before it is applied to the vessels A and B, and that the substance to be cooled is placed in vessel A and water in the vessel B, and the water will be drawn by the cloth C up from vessel B and will pass down said cloth alongside vessel A. The evaporation of moisture from the cloth will reduce the temperature of the vessel A, according to well-known laws. It will be noticed that the cloth C extends past the space between vessels A B or the lateral outlet for the fumes, &c., and prevents the ingress of flies and other insects, dust, and the like to the vessel A without impeding the passage of such fumes, &c., from the vessel A.

Manifestly, the vessels or pans A and B may be constructed of tin, zinc, or other metal, or other suitable material, such as potters' clay.

Having thus described my invention, what I claim as new is—

1. The cooling apparatus, substantially as herein described and shown, consisting of the main vessel adapted to contain the substance to be cooled, having its upper end open and the walls of said open end drawn or inclined inward, as described, the water-vessel supported on said main vessel, with a space between its bottom and the top of the main vessel, and made larger at its bottom than the upper open end of the main vessel, and the enveloping-sheet arranged to be wet by the contents of the water-vessel and extended past the space between the said vessels, whereby to protect the contents of the main vessel from insects, dust, &c., substantially as described, and for the purposes set forth.

2. The improved cooling apparatus, substantially as herein described, consisting of the main vessel having its upper end open, drawn or inclined inward at such upper open end, and provided with sockets, the water-vessel having its upper end open, its sides and bottom imperforate, and provided with depending legs, which fit in the sockets of the main vessel, and the enveloping-sheet fitted under the main vessel and having its ends carried up past the lateral opening between the water and main vessels and having its free end pressed within the water-vessel, all substantially as and for the purposes set forth.

FREDERICK STILES.

Witnesses:
JOHN H. STAPP,
JOS. A. STERNS.